UNITED STATES PATENT OFFICE.

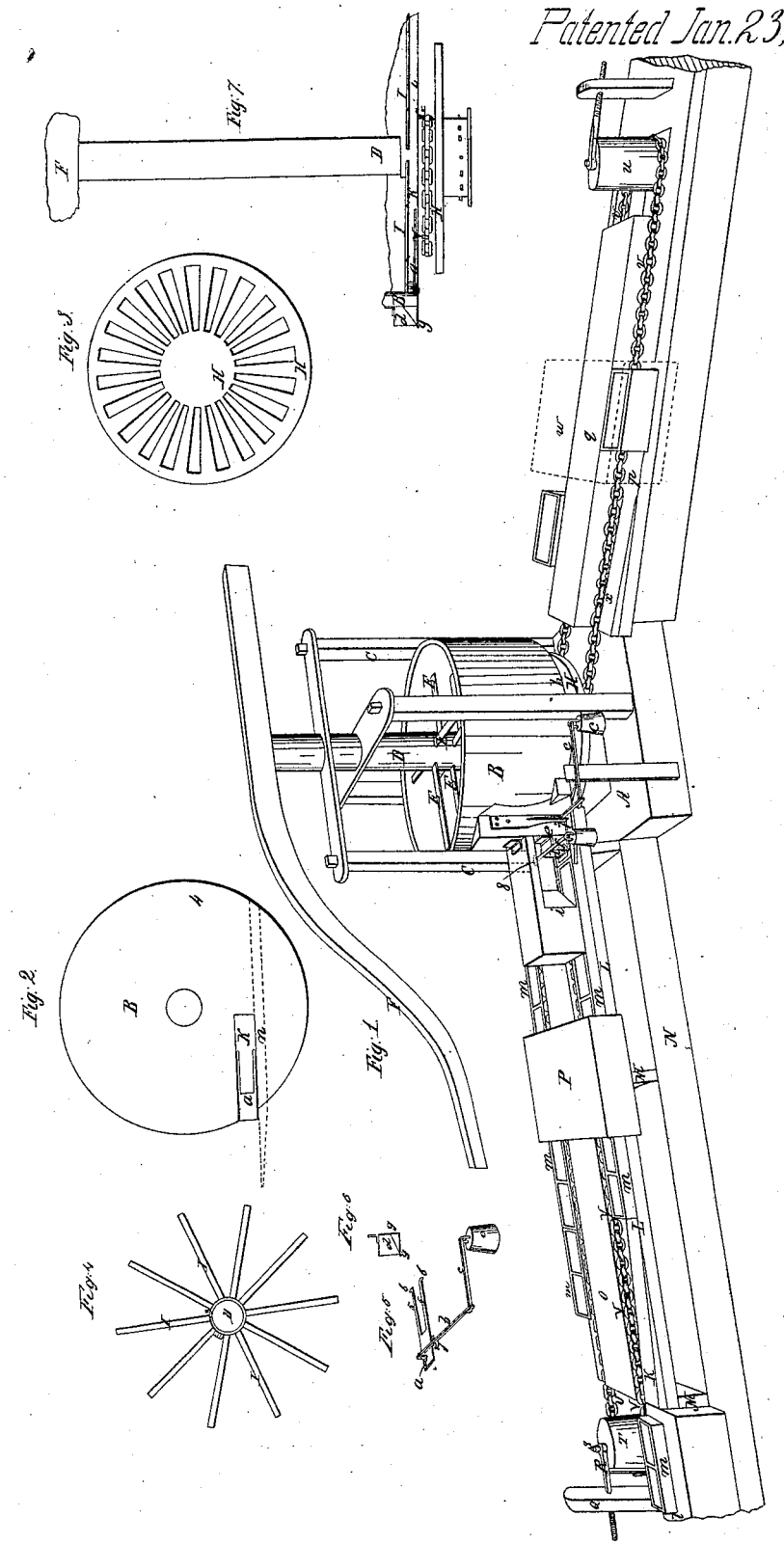

THOMAS CONKLIN, OF WOODVILLE, MISSISSIPPI.

METHOD OF CONSTRUCTING BRICK-PRESSES.

Specification of Letters Patent No. 1,947, dated January 23, 1841.

*To all whom it may concern:*

Be it known that I, THOMAS CONKLIN, of Woodville, in the county of Wilkinson and State of Mississippi, have invented a new and useful Machine for Making Bricks, which is described as follows, reference being had to the annexed drawings of the same, making part of this specification.

The nature of this invention consists in a certain new and useful combination and arrangement of parts of machinery forming a machine for bringing forward the dry clay and water to a tub in which they are mixed, discharging the pulverized and mixed clay into the empty molds which are brought forward on a horizontal way by an endless chain passing under the tub and carrying off on the other side by the same chain on which side the clay is pressed into the molds, struck, scraped, and liberated from the chain by an inclined plane and pushed forward upon a table from whence they are carried away by the off-bearers who empty the molds and return with them to the chain to which they are again attached for another operation—the whole work being performed by the power of one or more horses attached to a sweep fixed upon the upper end of a vertical shaft passed through the center of the mixing tub and traveling around in a circle on a horse walk formed around the tub attended by about three men and five boys and which machine will perform twice the work in less time than by the old mode of mixing and molding by hand and will not cost more than one or two hundred dollars to erect.

Figure 1 is a perspective view of the machine. Fig. 2 is the bottom of the tub—the dotted lines representing the position of the stop for turning the molds; Fig. 3, the circular platform; Fig. 4, the dischargers attached to the shaft for pushing the clay from the tub into the molds; Fig. 5, the first presser; Fig. 6, the second presser; Fig. 7, the shaft, pulleys and circular platform.

Similar letters refer to similar parts in the figures.

The following are the parts composing the combination: 1, the foundation; 2, the mixing tub; 3, the frame; 4, the shaft and its mixing knives, dischargers, cog wheels, circular platform, and sweep; 5, the way, guide, and inclined plane and foundation; 6, the endless chains; 7, screw rods and regulating pulleys—the first presser; 8, the second presser and striker; 9, the dischargers; 10, receiving table; 11, the molds; 12, stop or guide board; 13, apparatus for supplying the tub with dry clay consisting of another endless chain platform, guide, foundation, posts, screw rods, pulleys, bridge and inclined plane.

The foundation A of the mixing tub is made square, of timber framed together of suitable size and strength.

The mixing tub B its frame C shaft D knives E for cutting and mixing the clay and lever and sweep F are made in the usual manner.

A cogged pulley G for carrying the chain of the molds is fixed on the lower part of the shaft D directly under the tub.

A perforated circular horizontal platform H is fixed on and revolves with said shaft D directly below said last mentioned pulley G for sustaining and carrying around the molds to the opening in the tub. The perforations are for the purpose of allowing any clay that may fall upon it to pass through. Another cogged pulley $H^2$ is fixed on said shaft below said platform for carrying the chain which supplies the tub with clay on the opposite side of the frame. The shaft turns in a step on the foundation in the usual manner.

A set of obliquely placed blades I radiating from the periphery of a circular band 3 into which they are permanently fixed for pressing the clay through an opening K in the bottom (4) of the tub B into the molds, are placed between the lower set of mixing knives and the bottom (4) of the tub and fixed in a permanent manner to the shaft.

The oblong opening K in the bottom of the tub through which the mixed clay is discharged into the molds as they pass under it extends from the middle of the semi-diameter to the circumference in a line running parallel with the way of the chain carrying the molds. This way consists of a horizontal platform L of suitable length and breadth extending horizontally from one side of the frame of the tub to any convenient distance—its upper side being on a level with the upper side of the circular platform H before described and is supported by blocks M upon a foundation N of timber of the same width but of greater length and on the upper side is arranged a piece of board O a little more than one third its width for guiding the chain; and over this board is constructed a bridge P for the horse to travel over without touching the way and chains. Near the outer extremity of this way is erected a post Q through which are passed two horizontal screw bolts R with eyes in them in which turns a vertical shaft S passing through the center of a pulley T around which the endless chain U passes, which bolts are furnished with nuts for the purpose of tightening the chain where required. The endless chain U is made with links and straps; to every 6th or 7th of which a hook V is inserted to which the mold is attached by means of an eye W fixed at the corner of the mold. This chain passes around the aforesaid pulley T and the cogged pulley G immediately under the tub. The regulating pulley may be cogged or flanged for preventing the chain from slipping from its proper position thereon.

The first presser a for pressing the clay into the molds consists of a rectangular iron plate a with two parallel arms 5, 5 and two shoulders 6, 6 projecting from said arms and turning in openings in the side pieces placed around the opening K in the bottom 4 of the tub B and is pressed down upon the clay in the molds by means of a lever b turning on a horizontal pin 7 as its fulcrum outside the tub; under the long end of which lever is placed a weighted lever c. The second presser d is placed in front of the first and is hinged to a block of wood e fastened on the outside of the tub and is pressed down by another weighted lever f turning on a pin 8 as a fulcrum inserted into one of the posts of the frame of the tub—which pin is represented by dotted lines in Fig. 1. This presser d is sloped on the under side at g in the manner of a wedge or inclined plane having a wire g in front of the lower edge which comes down upon the molds for cutting off the surplus clay. An oblique or wedge shaped scraper or discharger i is hinged in front of this presser to the block and is used for the purpose of scraping off the surplus clay from the molds and discharging it at the side of the way.

An inclined plane k is formed at the end of the way upon which the molds are made to ascend for the purpose of disengaging them from the chain. A receiving table l for receiving the molds when liberated from the chain is constructed on the same horizontal plane with the thickest end of the said inclined plane upon which the molds are pushed by the succeeding molds as they approach it. The molds m are made in the usual manner with fixed bottoms and air holes except the eyes at the angles before described for hooking to the chain.

An oblique guide board n is fastened to the bottom of the tub parallel with the opening therein and on one side thereof for the purpose of turning the molds around so as to bring them exactly under the opening and in a line with it.

A platform p and guide q foundation and post s screw rods t pulley u, endless chain v bridge w (represented by dotted lines) and inclined plane x similar to those above described are constructed on the opposite side of the frame of the tub for the purpose of supplying it with dry earth to be mixed or this foundation may be made to radiate from one corner of the frame as represented in the drawing.

The water for saturating the clay is contained in a vessel placed above the mixing tub from which it may be let into the tub at pleasure.

The horse to propel the machine is attached to the sweep or lever.

The upper side of that part of the way next the mixing tub is faced with iron to prevent the chain wearing it in passing over it with the filled molds.

Operation: The molds being attached to the chain and the opening in the bottom of the tub closed by a slide and the machine being put in motion the clay is put into the mixing tub and a sufficient quantity of water admitted to saturate it and after being sufficiently mixed the slide is drawn out from the opening—the clay descends into the mold which moves forward under the first presser which presses the clay compactly into it—it then passes under the second presser which also presses it and likewise strikes the clay by means of the wire at the lower edge thereof and continuing to move forward strikes against the oblique scraper or discharger which pushes the surplus clay off at one side and when the mold arrives upon the inclined plane it is lifted from the chain which remains in its horizontal position and thus it is liberated therefrom and is pushed forward upon the table by the mold which immediately follows it which is treated in a similar manner and so on with all the molds attached to the endless chain which are drawn by it over the stationary way upon the circular revolving platform which carries them around to the opening in the bottom of the tub, first striking against the stop which throws them around to a proper position so as to pass directly under the said opening. The boys bear off the molds from the table—empty them and return with them to the chain and hook them to it again which carries them to the mixing tub to be refilled—being first properly sanded. The other endless chain brings forward the dry clay to the tub into which it is put by one of the attendants to be mixed in the usual manner of such mixing tubs.

What I claim as my invention and which I desire to secure by Letters Patent is—

The before described arrangement of the endless chains to which the molds are attached and the way, guides and inclined planes in combination with the circular revolving platform, the mixing tub, inclined dischargers therein, pressers, striker and discharger for making bricks in the manner herein set forth, there being a continuous line of empty molds made to pass under the discharging aperture in the bottom of the mixing tub while at the same time a similar line of filled molds are made to leave the aforesaid aperture, pressed, struck, scraped and the molds liberated from the chains by the inclined plane at the end of the way, and in combination therewith the endless chain for supplying the clay as described.

THOMAS CONKLIN.

Witnesses:
 WM. P. ELLIOT,
 E. MAHER.